United States Patent
Zhang et al.

(10) Patent No.: US 12,275,109 B2
(45) Date of Patent: Apr. 15, 2025

(54) DRILLING MACHINE TOOL WITH COOLING LIQUID PURIFYING AND RECYCLING MECHANISM

(71) Applicant: North China University of Science and Technology, Tangshan (CN)

(72) Inventors: Duo Zhang, Tangshan (CN); Haoqiang Zhang, Tangshan (CN); Xin Jin, Tangshan (CN); Suoxia Hou, Tangshan (CN); Hongyin Zhao, Tangshan (CN); Xinge Wang, Tangshan (CN)

(73) Assignee: North China University of Science and Technology, Hebei (CN)

( * ) Notice: Subject to any disclaimer, the term of this patent is extended or adjusted under 35 U.S.C. 154(b) by 468 days.

(21) Appl. No.: 17/835,473

(22) Filed: Jun. 8, 2022

(65) Prior Publication Data
US 2023/0286098 A1  Sep. 14, 2023

(30) Foreign Application Priority Data

Mar. 11, 2022  (CN) .......................... 202210236379.0

(51) Int. Cl.
*B23Q 11/10*  (2006.01)
*B23Q 3/06*  (2006.01)

(52) U.S. Cl.
CPC .......... *B23Q 11/1069* (2013.01); *B23Q 11/10* (2013.01); *B23B 2250/12* (2013.01);
(Continued)

(58) Field of Classification Search
CPC ................ B23Q 11/1069; B23Q 11/10; B23Q 2230/002; B23Q 5/043; B23Q 5/04;
(Continued)

(56) References Cited

FOREIGN PATENT DOCUMENTS

| CN | 109623002 A | * | 4/2019 | ............ B23B 39/00 |
| CN | 111266917 A | * | 6/2020 | |

(Continued)

OTHER PUBLICATIONS

CN 109623002 A A Mechanical Iron For Manufacturing Drilling Equipment (Year: 2019).*

(Continued)

*Primary Examiner* — Sunil K Singh
*Assistant Examiner* — Dustin James Trujillo
(74) *Attorney, Agent, or Firm* — TROUTMAN PEPPER LOCKE LLP

(57) ABSTRACT

A drilling machine tool with a cooling liquid purifying and recycling mechanism. The drilling machine tool comprises a platform in which a blanking hole is formed, wherein air cylinders are fixedly mounted at the top of a transverse plate located above the platform, a lifting plate is mounted after the output shaft ends of the air cylinders penetrate through the transverse plate, an isolation cylinder is arranged below the lifting plate, an opening is formed in the bottom of the isolation cylinder, the bottom end of the vertical shaft slidably penetrates through the isolation cylinder and is fixedly provided with a drill bit, the isolation cylinder is connected with the lifting plate through pressing mechanisms, and a cooling liquid conveying mechanism communicating with the interior of the isolation cylinder is arranged on the platform; and a cooling liquid purifying and recycling mechanism is arranged at the bottom of the platform.

7 Claims, 6 Drawing Sheets

(52) U.S. Cl.
CPC ........ *B23Q 3/069* (2013.01); *B23Q 2230/002* (2013.01); *Y10T 408/3839* (2015.01)

(58) Field of Classification Search
CPC . B23Q 5/046; Y10T 408/3839; Y10T 408/44; Y10T 408/46; Y10T 409/304032; Y10T 408/476; B23B 2250/12; B23B 2260/126; B23B 39/10; B23B 39/00; B23B 47/30; B23B 45/003; B23B 45/008
See application file for complete search history.

(56) References Cited

FOREIGN PATENT DOCUMENTS

| | | | |
|---|---|---|---|
| CN | 112405100 A | * | 2/2021 |
| CN | 213531750 U | * | 6/2021 |
| CN | 113182583 A | * | 7/2021 |
| CN | 113441745 A | * | 9/2021 |
| CN | 214977915 U | * | 12/2021 |

OTHER PUBLICATIONS

CN111266917—Metal product perforating device convenient to cool (Year: 2020).*
CN113441745A High Efficient Self Cleaning Perforating Device (Year: 2021).*
CN213531750U Drilling Device for Mold Production (Year: 2021).*
CN 113182583 A Cutting Device For Processing Metal Material (Year: 2021).*
CN-112405100-A Machine Tool Cooling Liquid Recycling Processing Device (Year: 2021).*
CN 214977915 Spring Pressing Plate Drilling Equipment for metal product processing (Year: 2021).*

* cited by examiner

DRILLING MACHINE TOOL WITH COOLING LIQUID PURIFYING AND RECYCLING MECHANISM

This application claims the benefit of China Patent Application No. 202210236379.0, filed Mar. 11, 2022, which is incorporated by reference in its entirety.

FIELD

The present disclosure relates to the technical field of drilling, in particular to a drilling machine tool with a cooling liquid purifying and recycling mechanism

BACKGROUND

The drilling machine tool is a machine tool for drilling workpieces by using a drill bit. The working principle of the drilling machine tool is that a drill bit tool which is harder and sharper than the target object is used for drilling a cylindrical hole or a hole in the target object in a rotary cutting or rotary extruding mode. Currently, the drilling machine tool is widely applied to industrial mechanical production, so that the drilling machine tool is suitable for drilling parts and plates.

However, when the common drilling machine tool is used, the function of automatically pressing and fixing the object is not achieved. Generally, the object is clamped and fixed to the machine tool through manual operation, then the clamped object is drilled, and after drilling is completed, fixing of the object is relieved through manual operation. The operation steps of the drilling mode are tedious, and time and labor are wasted, resulting in low working efficiency. Metal scraps generated during drilling and sprayed cooling liquid splash everywhere, the working environment is messy, and time and effort need to be spent for cleaning and sweeping after the work is finished. The spraying direction of the cooling liquid sprayed during drilling is usually fixed, the cooling liquid is not uniformly sprayed on the surface of the drill bit and the drilling position of the object, so that the cooling and lubricating effects on the drill bit are not good enough, the drilling quality is affected, and the service life of the drill bit is shortened. Moreover, the function of recycling, purifying and recycling the cooling liquid is not achieved, the used cooling liquid is generally directly discharged, the cooling liquid is much wasted, the consumption is large, and resources are wasted.

SUMMARY

The present disclosure aims to provide a drilling machine tool with a cooling liquid purifying and recycling mechanism so as to solve the problems in the prior art, cooling liquid can be reused after being recycled and purified, waste of the cooling liquid is reduced, and resources are saved.

In order to achieve the purpose, the present disclosure provides the following scheme.

The present disclosure provides a drilling machine tool with a cooling liquid purifying and recycling mechanism, comprising a platform in which a blanking hole is formed, wherein a plurality of support pillars are fixedly mounted at the bottom of the platform, a vertically-arranged support plate is fixedly mounted on one side of the top of the platform, a transverse plate is fixedly mounted at the top of the support plate, two air cylinders are fixedly mounted at the top of the transverse plate, two through holes are formed in the top of the transverse plate, the output shafts of the two air cylinders penetrate through the corresponding through holes respectively, a same lifting plate is fixedly mounted at the output shaft ends of the two air cylinders, a motor is fixedly mounted at the top of the lifting plate, the output shaft of the motor is in transmission connection with a vertical shaft, the vertical shaft movably penetrates through the lifting plate, an isolation cylinder is arranged below the lifting plate, an opening is formed in the bottom of the isolation cylinder, the bottom end of the vertical shaft slidably penetrates through the isolation cylinder and is fixedly provided with a drill bit, the isolation cylinder is connected with the lifting plate through pressing mechanisms, and a cooling liquid conveying mechanism communicating with the interior of the isolation cylinder is arranged on the platform; and a cooling liquid purifying and recycling mechanism is arranged at the bottom of the platform and comprises a liquid storage tank, an opening is formed in the top of the liquid storage tank, a purifying assembly is arranged in the liquid storage tank, the liquid storage tank is located below the blanking hole, and the cooling liquid conveying mechanism communicates with the liquid storage tank.

Optionally, the pressing mechanisms comprise an annular pressing plate, two connecting bases, two sliding rods and two springs; the annular pressing plate is fixedly mounted at the bottom of the isolation cylinder, the two connecting bases are fixedly mounted on the outer walls of the two sides of the isolation cylinder respectively, the bottom ends of the two sliding rods are fixedly connected with the tops of the corresponding connecting bases respectively, the top ends of the two sliding rods slidably penetrate through the lifting plate, the two springs sleeve the two sliding rods respectively, the bottom ends of the two springs are fixedly connected with the tops of the corresponding connecting bases respectively, and the top ends of the two springs are fixedly connected with the bottom of the lifting plate respectively.

Optionally, a first sliding hole is formed in the inner wall of the top of the isolation cylinder, and the bottom end of the vertical shaft penetrates through the first sliding hole and is fixedly provided with the drill bit; and a first sealing ring is fixedly mounted on the inner wall of the first sliding hole, and the vertical shaft is in sliding sealing fit with the first sliding hole through the first sealing ring.

Optionally, the cooling liquid conveying mechanism comprises a conveying pump, a liquid suction pipe, a hose, a hollow shaft, a liquid outlet disc, a plurality of spray heads, an L-shaped pipe and a transmission assembly; the conveying pump is fixedly mounted on the outer wall of the left side of the liquid storage tank, the liquid suction pipe is fixedly mounted at the suction end of the conveying pump, the end, away from the conveying pump, of the liquid suction pipe extends into the liquid storage tank, one end of the hose is fixedly connected with the discharge end of the conveying pump, a positioning hole is formed in the inner wall of the left side of the isolation cylinder, the hollow shaft is rotatably mounted in the positioning hole through a bearing, the two ends of the hollow shaft both extend out of the positioning hole, the liquid outlet disc is fixedly mounted at the right end of the hollow shaft, the hollow shaft communicates with the interior of the liquid outlet disc, the spray heads are fixedly mounted on the side, away from the hollow shaft, of the liquid outlet disc at equal intervals, the L-shaped pipe is slidably mounted on the left side wall of the support plate through a pipe clamp, one end of the L-shaped pipe is fixedly connected with the end, away from the conveying pump, of the hose, the end, away from the hose, of the L-shaped pipe extends into the hollow shaft, a second sealing ring is fixedly mounted on the inner wall of the hollow shaft, and the L-shaped pipe is matched with the hollow shaft in a rotary sealing mode through the second sealing ring.

Optionally, a vertically-arranged strip-shaped hole is formed in one side of the support plate, and the left end of the hollow shaft penetrates through the strip-shaped hole.

Optionally, the transmission assembly comprises a lower shaft seat, a lower rotating shaft, a lower transmission bevel gear, a driven bevel gear, a positioning seat, an upper rotating shaft, a rectangular rod, an upper shaft seat, a transmission shaft, a driving bevel gear, an upper transmission bevel gear, a worm wheel and a worm, the lower shaft seat is fixedly mounted on the inner wall of the left side of the isolation cylinder, the lower rotating shaft is rotatably mounted on the lower shaft seat, the lower transmission bevel gear is fixedly mounted at the bottom end of the lower rotating shaft, the driven bevel gear fixedly sleeves the hollow shaft, the lower transmission bevel gear is meshed with the driven bevel gear, the positioning seat and the upper shaft seat are both fixedly mounted at the bottom of the lifting plate, the upper rotating shaft is rotatably mounted at the bottom of the positioning seat, a second sliding hole is formed in the inner wall of the top of the isolation cylinder, the bottom end of the upper rotating shaft penetrates through the second sliding hole and is provided with a rectangular groove, the rectangular rod is slidably mounted in the rectangular groove, the bottom end of the rectangular rod extends out of the rectangular groove and is fixedly connected with the top end of the lower rotating shaft, the transmission shaft is rotatably mounted on the upper shaft seat, the driving bevel gear is fixedly mounted at the left end of the transmission shaft, the upper transmission bevel gear fixedly sleeves the upper rotating shaft, the driving bevel gear is meshed with the upper transmission bevel gear, the worm wheel is fixedly mounted at the right end of the transmission shaft, the worm fixedly sleeves the vertical shaft, and the worm is meshed with the worm wheel.

Optionally, a third sealing ring is fixedly mounted on the inner wall of the second sliding hole, and the upper rotating shaft is in sliding sealing fit with the second sliding hole through the second sealing ring.

Optionally, the purifying assembly comprises a filter screen and an activated carbon filter plate, the filter screen and the activated carbon filter plate are both fixedly mounted in the liquid storage tank, and the filter screen is obliquely arranged above the activated carbon filter plate.

Optionally, a cleaning port located above the filter screen is formed in the inner wall of the right side of the liquid storage tank, a cover plate is fixedly mounted on the outer wall of the right side of the liquid storage tank through screws, the cover plate is matched with the cleaning port, a residue discharging hole is formed in the inner wall of the bottom of the liquid storage tank, and a cock is mounted in the residue discharging hole in a threaded mode.

Compared with the prior art, the present disclosure has the following technical effects.

According to the drilling machine tool with a cooling liquid purifying and recycling mechanism provided by the present disclosure, the vertical shaft and the drill bit can be controlled to rotate by starting the motor. The isolation cylinder, the vertical shaft, the drill bit and the annular pressing plate can be controlled to vertically move downwards by starting the two air cylinders to work. Vertically downward acting force is applied to the two connecting bases, the isolation cylinder and the annular pressing plate by utilizing the two springs. An object to be drilled can be automatically pressed and fixed to the top of the platform by utilizing the annular pressing plate, the object can be prevented from shifting in the drilling process, and the object does not need to be manually operated and fixed and then drilled, so that the operation steps are reduced, the working time is saved, and the working efficiency is improved. The object can be drilled by utilizing continuous downward movement and rotation of the drill bit.

Cooling liquid can be controlled to be sprayed out from the spray heads by starting the conveying pump. The vertical shaft and the hollow shaft can be controlled to rotate at the same time by utilizing meshing transmission of the worm and the worm wheel, meshing transmission of the driving bevel gear and the upper transmission bevel gear and meshing transmission of the lower transmission bevel gear and the driven bevel gear, so that the hollow shaft drives the liquid outlet disc and the spray heads to rotate, the cooling liquid sprayed from the spray heads can be sprayed to the surface of the drill bit and the drilling position of the object more fully and evenly, the drill bit can be effectively cooled and lubricated, the drilling quality is improved, and the service life of the drill bit is prolonged.

Metal scraps generated in the drilling process and sprayed cooling liquid can be blocked and intercepted by utilizing the isolation cylinder, so that the situation that the metal scraps and the cooling liquid splash everywhere to cause mess of the environment is avoided.

The metal scraps in the cooling liquid can be intercepted and filtered by utilizing the filter screen, and fine particles in the cooling liquid can be adsorbed and purified by utilizing the activated carbon filter plate, so that the cooling liquid can be reused after being recycled and purified, waste of the cooling liquid is reduced, and resources are saved.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs: 1, platform; 2, blanking hole; 3, support pillar; 4, support plate; 5, transverse plate; 6, air cylinder; 7, lifting plate; 8, motor; 9, vertical shaft; 10, isolation cylinder; 11, drill bit; 12, annular pressing plate; 13, connecting base; 14, sliding rod; 15, spring; 16, conveying pump; 17, liquid suction pipe; 18, hose; 19, hollow shaft; 20, liquid outlet disc; 21, spray head; 22, L-shaped pipe; 23, strip-shaped hole; 24, lower shaft seat; 25, lower rotating shaft; 26, lower transmission bevel gear; 27, driven bevel gear; 28, positioning seat; 29, upper rotating shaft; 30, rectangular groove; 31, rectangular rod; 32, upper shaft seat; 33, transmission shaft; 34, driving bevel gear; 35, upper transmission bevel gear; 36, worm wheel; 37, worm; 38, filter screen; 39, activated carbon filter plate; and 40, liquid storage tank.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a drilling machine tool with a cooling liquid purifying and recycling mechanism so as to solve the problems in the prior art, and cooling liquid can be reused after being recycled and purified.

To make the foregoing objective, features and advantages of the present disclosure clearer and more comprehensible, the present disclosure is further described in detail below with reference to the attached figures and specific embodiments.

Figure 1:
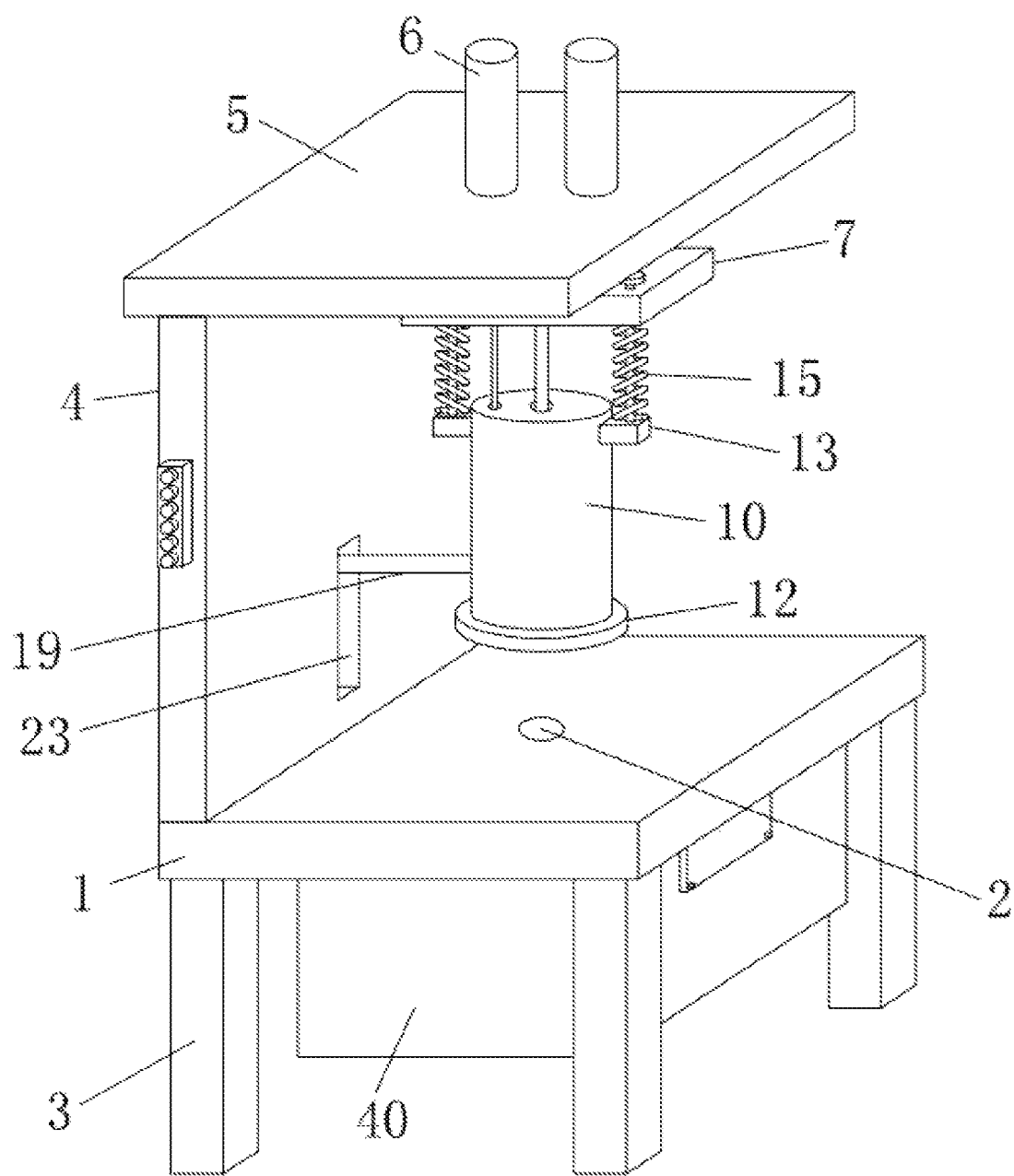
FIG. 1 is a solid structural schematic diagram of the present disclosure.
Figure 2:
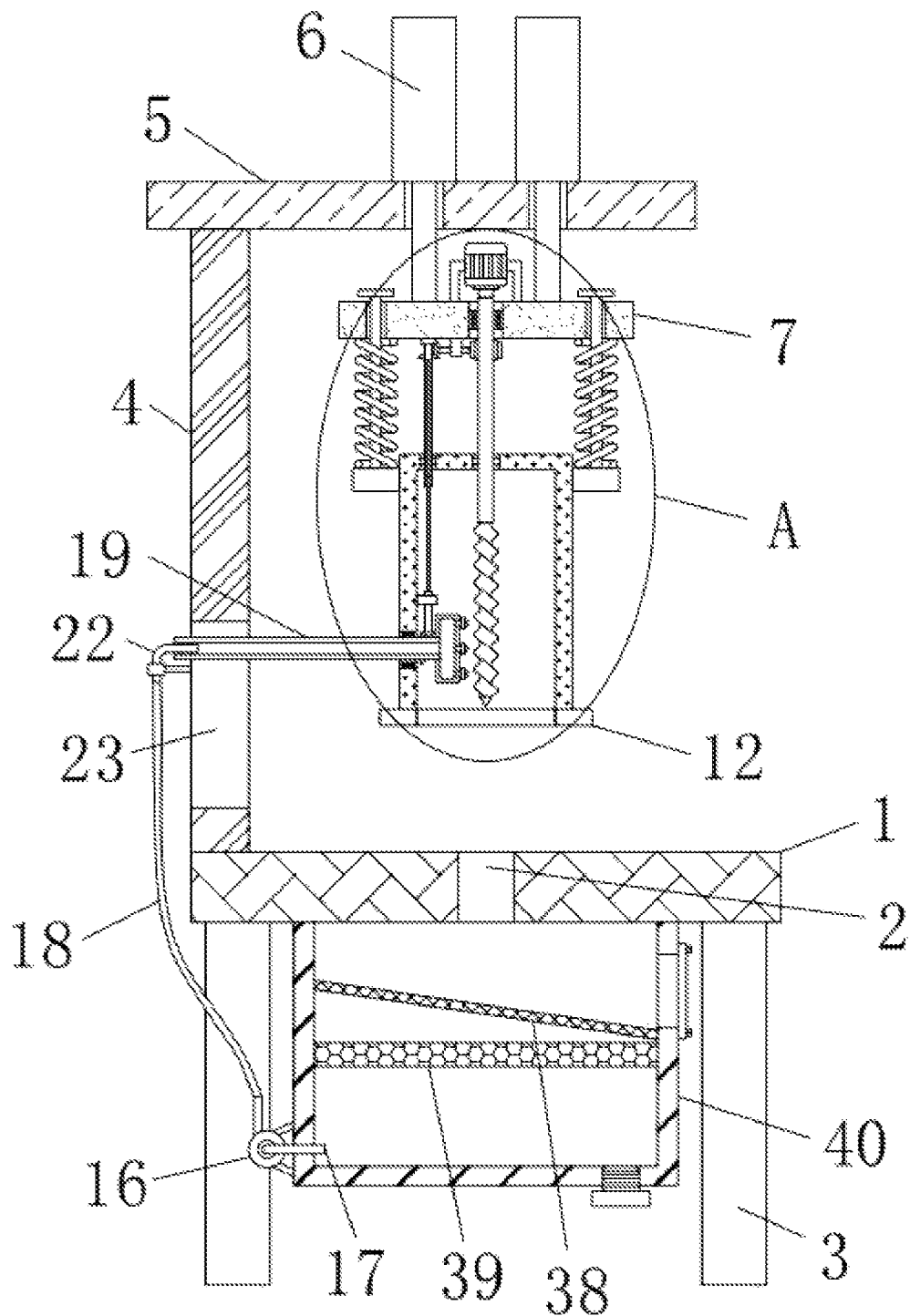
FIG. 2 is a structural schematic diagram of a section view of a front view of the present disclosure.
Figure 3:
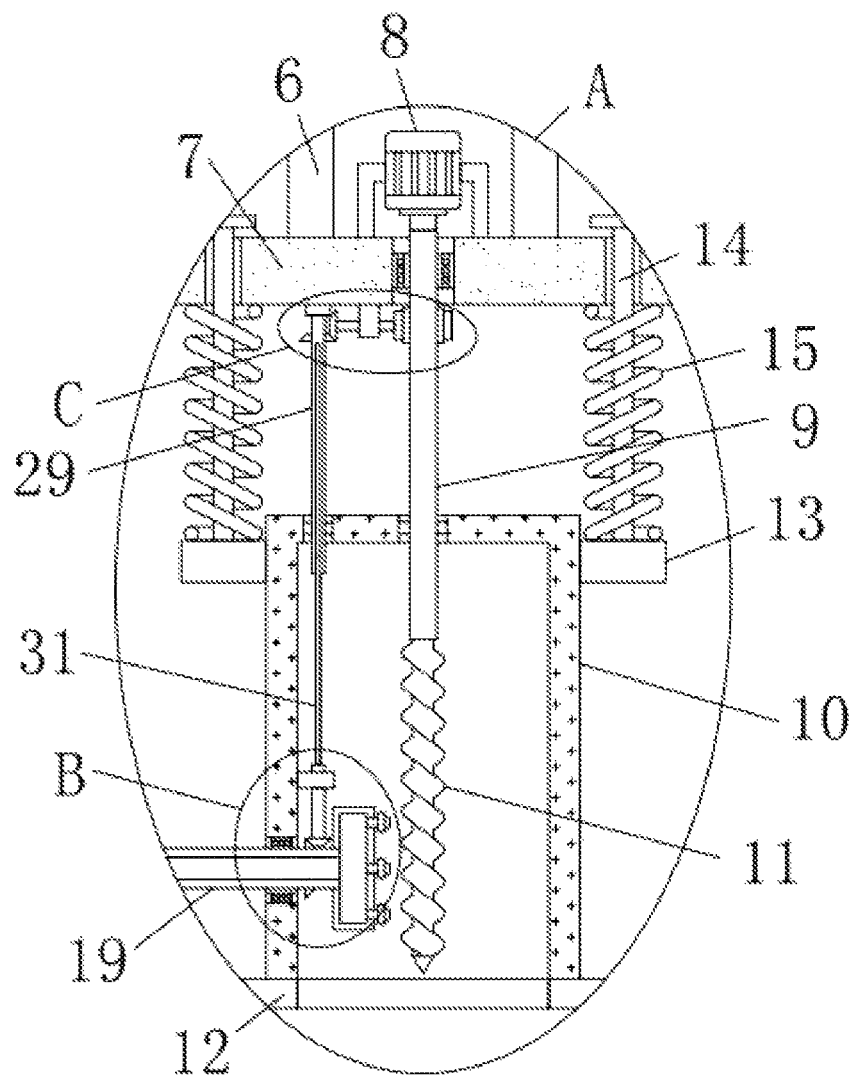
FIG. 3 is an enlarged drawing of part A in FIG. 2.
Figure 4:
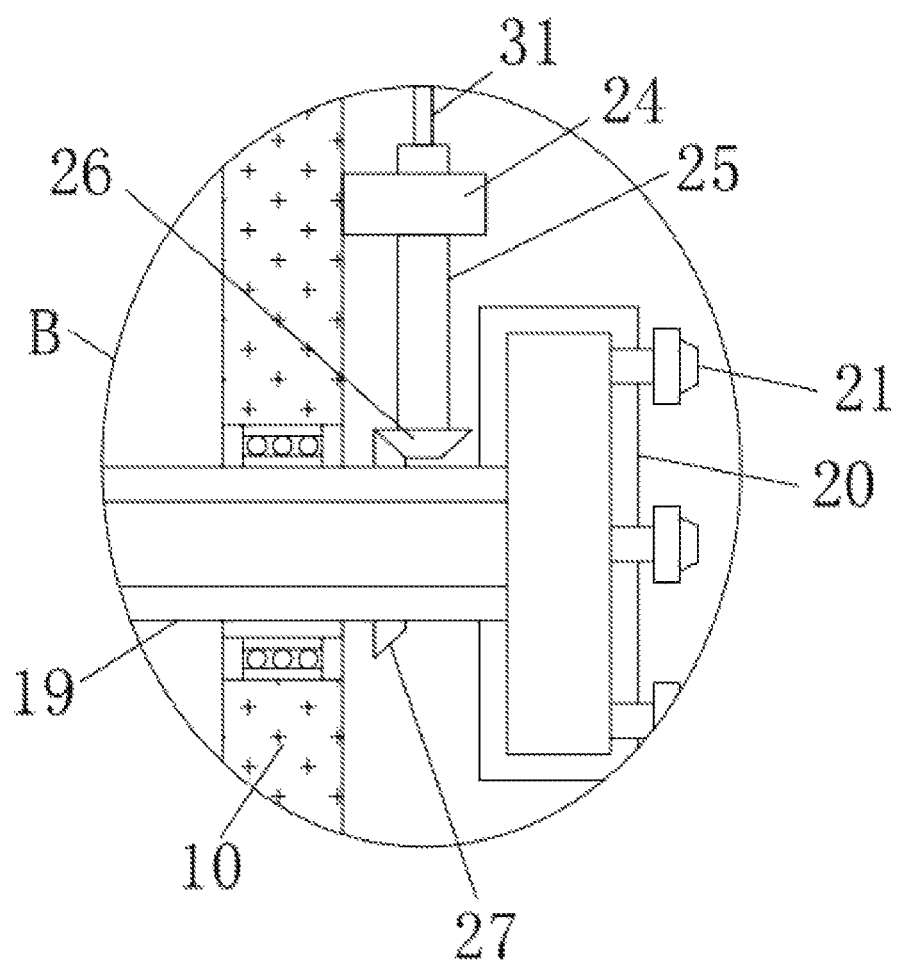
FIG. 4 is an enlarged drawing of part B in FIG. 3.
Figure 5:
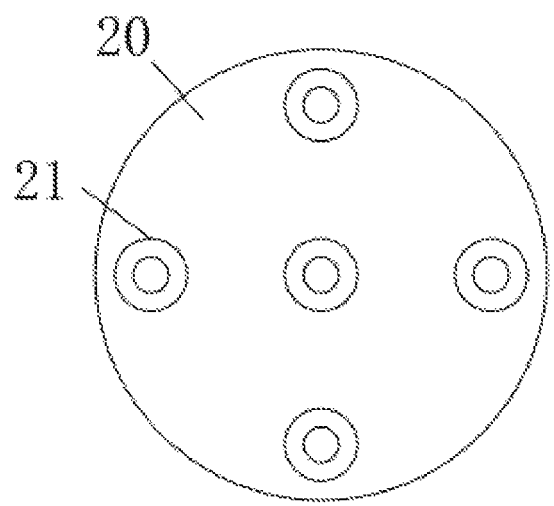
FIG. 5 is a structural schematic diagram of a right view of a liquid outlet disc.
Figure 6:
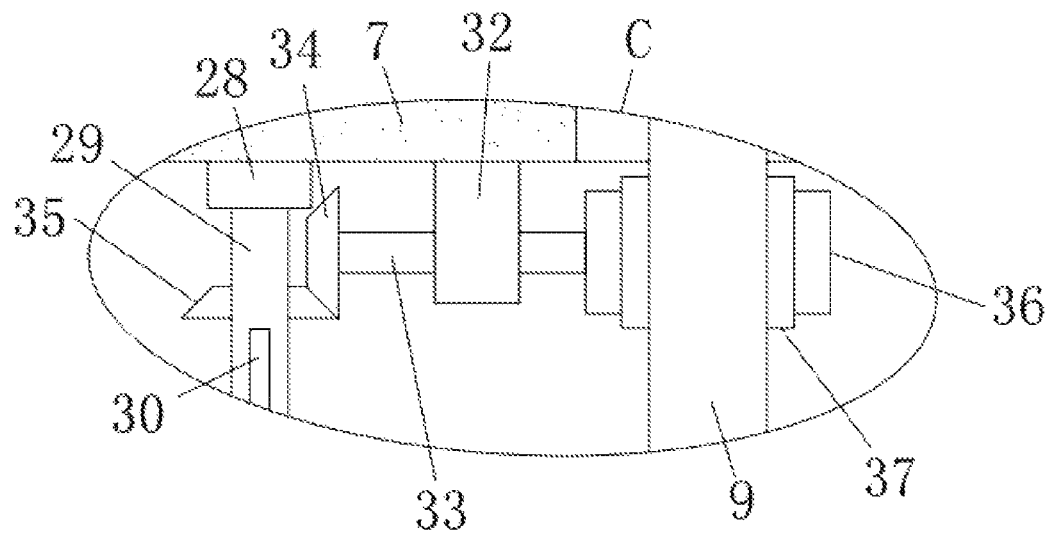
FIG. 6 is an enlarged drawing of part C in FIG. 3.
Figure 7:
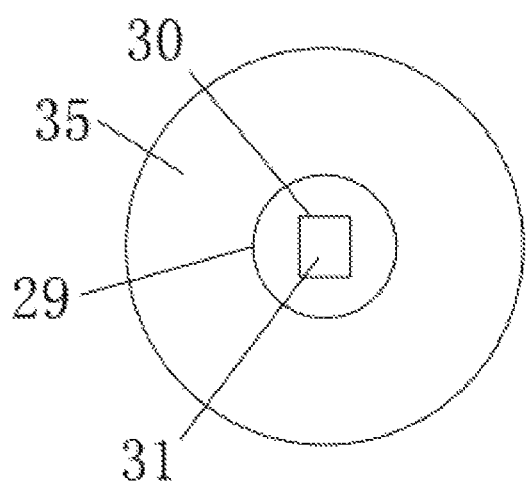
FIG. 7 is a structural schematic diagram of a bottom view of an upper rotating shaft.

As shown in FIG. 1 to FIG. 7, the present disclosure provides a drilling machine tool with a cooling liquid purifying and recycling mechanism, comprising a platform 1 in which a blanking hole 2 is formed, wherein four symmetrically-arranged support pillars 3 are fixedly mounted at the bottom of the platform 1, a vertically-arranged support plate 4 is fixedly mounted on one side of the top of the platform 1, a transverse plate 5 is fixedly mounted at the top of the support plate 4, two air cylinders 6 are fixedly mounted at the top of the transverse plate 5, two through holes are formed in the top of the transverse plate 5, the output shafts of the two air cylinders 6 penetrate through the corresponding through holes respectively, a same lifting plate 7 is fixedly mounted at the output shaft ends of the two air cylinders 6, a motor 8 is fixedly mounted at the top of the lifting plate 7, a mounting hole is formed in the top of the lifting plate 7, a vertical shaft 9 is rotatably mounted in the mounting hole through a bearing, the two ends of the vertical shaft 9 extend out of the mounting hole, the top end of the vertical shaft 9 is fixedly connected with the output shaft end of the motor 8, an isolation cylinder 10 is arranged below the lifting plate 7, an opening is formed in the bottom of the isolation cylinder 10, metal scraps generated in the drilling process and sprayed cooling liquid can be blocked and intercepted by utilizing the isolation cylinder 10, so that the situation that the metal scraps and the cooling liquid splash everywhere to cause mess of the environment is avoided. A first sliding hole is formed in the inner wall of the top of the isolation cylinder 10, and the bottom end of the vertical shaft 9 penetrates through the first sliding hole and is fixedly provided with a drill bit 11. The isolation cylinder 11 is provided with pressing mechanisms, and the platform 1 is provided with a cooling liquid conveying mechanism Through the arrangement of the pressing mechanisms, an object to be drilled can be automatically pressed and fixed to the top of the platform 1, and then in the drilling process, drilling deviation or object damage caused by deviation of the object is avoided. Through the arrangement of the cooling liquid conveying mechanism, the cooling liquid can be fully and evenly sprayed to the surface of the drill bit 11 and the drilling position of the object, then the drill bit 11 can be effectively cooled and lubricated, the drilling quality is guaranteed, the service life of the drill bit 11 is prolonged, the cooling liquid can be reused after being recycled and purified, waste of the cooling liquid is reduced, and resources are saved.

In the embodiment, the pressing mechanisms comprise an annular pressing plate 12, two connecting bases 13, two sliding rods 14 and two springs 15; the annular pressing plate 12 is fixedly mounted at the bottom of the isolation cylinder 10, the two connecting bases 13 are fixedly mounted on the outer walls of the two sides of the isolation cylinder 10 respectively, the bottom ends of the two sliding rods 14 are fixedly connected with the tops of the corresponding connecting bases 13 respectively, the top ends of the two sliding rods 14 slidably penetrate through the lifting plate 7, the bottom ends of the two springs 15 are fixedly connected with the tops of the corresponding connecting bases 13 respectively, and the top ends of the two springs 15 are fixedly connected with the bottom of the lifting plate 7 respectively. Vertically downward acting force is applied to the annular pressing plate 12 by utilizing the two springs 15. An object to be drilled can be pressed and fixed to the top of the platform 1 by utilizing the annular pressing plate 12. The isolation cylinder 10 and the annular pressing plate 12 can be controlled to automatically return to the original positions by utilizing the elastic force of the springs 15.

In the embodiment, a first sealing ring is fixedly mounted on the inner wall of the first sliding hole, and the vertical shaft 9 is in sliding sealing fit with the first sliding hole through the first sealing ring; and the first sealing ring is arranged, so that a gap between the vertical shaft 9 and the first sliding hole can be sealed, and the cooling liquid is prevented from being discharged from the gap between the vertical shaft 9 and the first sliding hole.

In the embodiment, the cooling liquid conveying mechanism comprises a conveying pump 16, a liquid suction pipe 17, a hose 18, a hollow shaft 19, a liquid outlet disc 20, a plurality of spray heads 21, an L-shaped pipe 22 and a transmission assembly; the top of a liquid storage tank 40 of the cooling liquid purifying and recycling mechanism is of an opening structure, the liquid storage tank 40 is fixedly mounted at the bottom of the platform 1, the blanking hole 2 communicates with the interior of the liquid storage tank 40, the conveying pump 16 is fixedly mounted on the outer wall of the left side of the liquid storage tank, the liquid suction pipe 17 is fixedly mounted at the suction end of the conveying pump 16, the end, away from the conveying pump 16, of the liquid suction pipe 17 extends into the liquid storage tank 40, one end of the hose 18 is fixedly connected with the discharge end of the conveying pump 16, a positioning hole is formed in the inner wall of the left side of the isolation cylinder 10, the hollow shaft 19 is rotatably mounted in the positioning hole through a bearing, the two ends of the hollow shaft 19 both extend out of the positioning hole, the liquid outlet disc 20 is fixedly mounted at the right end of the hollow shaft 19, the hollow shaft 19 communicates with the interior of the liquid outlet disc 20, the spray heads 21 are fixedly mounted on the side, away from the hollow shaft 19, of the liquid outlet disc 20 at equal intervals, the L-shaped pipe 22 is slidably mounted on the left side wall of the support plate 4 through a pipe clamp so that the L-shaped pipe 22 can slide up and down on the left side wall of the support plate 4, one end of the L-shaped pipe 22 is fixedly connected with the end, away from the conveying pump 16, of the hose 18, the end, away from the hose 18, of the L-shaped pipe 22 extends into the hollow shaft 19, a second sealing ring is fixedly mounted on the inner wall of the hollow shaft 19, and the L-shaped pipe 22 is matched with the hollow shaft 19 in a rotary sealing mode through the second sealing ring. The cooling liquid can be stored by utilizing the liquid storage tank 40, and the cooling liquid in the liquid storage tank 40 can be conveyed by utilizing the conveying pump 16, so that the cooling liquid can be sprayed out of the spray heads 21. The second sealing ring is arranged, and a gap between the L-shaped pipe 22 and the hollow shaft 19 can be sealed, so that the cooling liquid is prevented from overflowing from the gap between the L-shaped pipe 22 and the hollow shaft 19.

In the embodiment, a strip-shaped hole 23 is formed in one side of the support plate 4, and the left end of the hollow shaft 19 penetrates through the strip-shaped hole 23. The hollow shaft 19 can move downwards or ascend smoothly by forming the vertically-arranged strip-shaped hole 23.

In the embodiment, the transmission assembly comprises a lower shaft seat 24, a lower rotating shaft 25, a lower transmission bevel gear 26, a driven bevel gear 27, a positioning seat 28, an upper rotating shaft 29, a rectangular rod 31, an upper shaft seat 32, a transmission shaft 33, a driving bevel gear 34, an upper transmission bevel gear 35, a worm wheel 36 and a worm 37, the lower shaft seat 24 is fixedly mounted on the inner wall of the left side of the isolation cylinder 10, the lower rotating shaft 25 is rotatably mounted on the lower shaft seat 24, the lower transmission bevel gear 26 is fixedly mounted at the bottom end of the lower rotating shaft 25, the driven bevel gear 27 fixedly sleeves the hollow shaft 19, the lower transmission bevel gear 26 is meshed with the driven bevel gear 27, the positioning seat 28 and the upper shaft seat 32 are both fixedly mounted at the bottom of the lifting plate 7, the upper rotating shaft 29 is rotatably mounted at the bottom of the positioning seat 28, a second sliding hole is formed in the inner wall of the top of the isolation cylinder 10, the bottom end of the upper rotating shaft 29 penetrates through the second sliding hole and is provided with a rectangular groove 30, the rectangular rod 31 is slidably mounted in the rectangular groove 30, the bottom end of the rectangular rod 31 extends out of the rectangular groove 30 and is fixedly connected with the top end of the lower rotating shaft 25, the transmission shaft 33 is rotatably mounted on the upper shaft seat 32, the driving bevel gear 34 is fixedly mounted at the left end of the transmission shaft 33, the upper transmission bevel gear 35 fixedly sleeves the upper rotating shaft 29, the driving bevel gear 34 is meshed with the upper transmission bevel gear 35, the worm wheel 36 is fixedly mounted at the right end of the transmission shaft 33, the worm 37 fixedly sleeves the vertical shaft 9, and the worm 37 is meshed with the worm wheel 36. The vertical shaft 9 and the hollow shaft 19 can be controlled to rotate at the same time by utilizing meshing transmission of the worm 37 and the worm wheel 36, meshing transmission of the driving bevel gear 34 and the upper transmission bevel gear 35 and meshing transmission of the lower transmission bevel gear 26 and the driven bevel gear 27. Moreover, the rotating speed of the vertical shaft 9 is smaller than that of the hollow shaft 19, and the rectangular rod 31 is slidably connected and matched in the rectangular groove 30, so that when the upper rotating shaft 29, the rectangular rod 31 and the lower rotating shaft 25 rotate at the same time, the rectangular rod 31 can be controlled to slide in the rectangular groove 30.

In the embodiment, a third sealing ring is fixedly mounted on the inner wall of the second sliding hole, and the upper rotating shaft 29 is in sliding sealing fit with the second sliding hole through the third sealing ring. Through the arrangement of the third sealing ring, a gap between the upper rotating shaft 29 and the second sliding hole can be sealed.

In the embodiment, the liquid storage tank 40 is internally provided with a purifying assembly, the purifying assembly comprises a filter screen 38 and an activated carbon filter plate 39, the filter screen 38 and the activated carbon filter plate 39 are both fixedly mounted in the liquid storage tank 40, and the filter screen 38 is obliquely arranged above the activated carbon filter plate 39. The filter screen 38 is obliquely arranged, the metal scraps in the cooling liquid can be intercepted and filtered by utilizing the filter screen 38, and fine particles in the cooling liquid can be adsorbed and purified by arranging the activated carbon filter plate 39, so that impurities in the cooling liquid can be purified and cleaned.

In the embodiment, a cleaning port located above the filter screen 38 is formed in the inner wall of the right side of the liquid storage tank 40, a cover plate is fixedly mounted on the outer wall of the right side of the liquid storage tank 40 through screws, the cover plate is matched with the cleaning port, a residue discharging hole is formed in the inner wall of the bottom of the liquid storage tank 40, and a cock is mounted in the residue discharging hole in a threaded mode. Through the arrangement of the cleaning port and the cover plate, the metal scraps on the filter screen 38 can be conveniently cleaned. Through the arrangement of the residue discharging hole and the cock, the cooling liquid in the liquid storage tank 40 can be conveniently discharged and replaced. The cooling liquid can be added into the liquid storage tank 40 at the blanking hole 2.

In the embodiment, a multi-control switch is mounted on the support plate 4, the two air cylinders 6, the motor 8, the conveying pump 16 and the multi-control switch are sequentially and electrically connected with an external power line through wires to form a loop, and the multi-control switch can control starting, stopping and resetting of the two air cylinders 6 and can also control starting and stopping of the motor 8 and the conveying pump 16 respectively.

In the working process of the drilling machine tool, the object to be drilled is placed on the top of the platform 1, the position, to be drilled, of the object is located under the drill bit 11, a power source is switched on, the motor 8 is started, the motor 8 drives the vertical shaft 9 and the drill bit 11 to rotate, and then the two air cylinders 6 are started to work. The two air cylinders 6 drive the lifting plate 7, the two sliding rods 14, the two springs 15, the two connecting bases 13, the isolation cylinder 10, the motor 8, the vertical shaft 9, the drill bit 11 and the annular pressing plate 12 to vertically move downwards, and the isolation cylinder 10 drives the hollow shaft 19 to move downwards. When the annular pressing plate 12 moves downwards to be in contact with the surface of the object, the position of the annular pressing plate 12 does not change any more. The two sliding rods 14 slide upwards, and the rectangular rod 31 gradually slides into the rectangular groove 30, so that the two springs 15 are compressed and deformed to generate elastic force. The vertically downward acting force is applied to the two connecting bases 13, the isolation cylinder 10 and the annular pressing plate 12 by utilizing the two springs 15, and then the object to be drilled can be automatically pressed and fixed to the top of the platform 1 by utilizing the annular pressing plate 12, so that displacement of the object in the drilling process can be avoided, the object does not need to be manually operated and fixed and then drilled, the operation steps are reduced, the working time is saved, and the working efficiency can be improved. The object can be drilled when the drill bit 11 continues to move downwards to make contact with the object. In the drilling process, by starting the conveying pump 16 to work, the cooling liquid in the liquid storage tank 40 can be conveyed, and the cooling liquid can be sprayed out of the spray heads 21. The upper rotating shaft 29, the rectangular rod 31, the lower rotating shaft 25 and the vertical shaft 9 rotate at the same time by utilizing meshing transmission of the worm 37 and the worm gear 36 and meshing transmission of the driving bevel gear 34 and the upper transmission bevel gear 35. The lower rotating shaft 25 and the hollow shaft 19 rotate at the same time by utilizing meshing transmission of the lower transmission bevel gear 26 and the driven bevel gear 27. The rectangular rod 31 is slidably connected and matched in the rectangular groove 30, so that when the upper rotating shaft 29, the rectangular rod 31 and the lower rotating shaft 25 rotate at the same time, the rectangular rod 31 can be controlled to slide in the rectangular groove 30, and then the vertical shaft 9 and the hollow shaft 19 can be controlled to rotate at the same time. Moreover, the rotating speed of the vertical shaft 9 is smaller than that of the hollow shaft 19, and the hollow shaft 19 drives the liquid outlet disc 20 and the spray heads 21 to rotate, so that the cooling liquid sprayed from the spray heads 21 can be fully and evenly sprayed to the surface of the drill bit 11 and the drilling position of the object, the drill bit 11 can be effectively cooled and lubricated, the drilling quality is guaranteed, and the service life of the drill bit 11 is prolonged. Metal scraps generated in the drilling process and sprayed cooling liquid can be blocked and intercepted by utilizing the isolation cylinder 10, the metal scraps and the cooling liquid are located in the isolation cylinder 10, the situation that the metal scraps and the cooling liquid splash everywhere to cause mess of the environment is avoided, the cooling liquid containing the scraps generated in the drilling process falls into the liquid storage tank 40 through the blanking hole 2, the metal scraps in the cooling liquid can be intercepted and filtered by utilizing the filter screen 38, and fine particles in the cooling liquid can be adsorbed and purified by utilizing the activated carbon filter plate 39, so that impurities in the cooling liquid can be purified and cleaned, the cooling liquid is reused after being recycled and purified, waste of the cooling liquid is reduced, and resources are saved. After drilling is completed, the motor 8 and the conveying pump 16 are stopped, the two air cylinders 6 are started to reset, the two air cylinders 6 drive the lifting plate 7, the two sliding rods 14, the two springs 15, the two connecting bases 13, the isolation cylinder 10, the motor 8, the vertical shaft 9, the drill bit 11 and the annular pressing plate 12 to vertically move upwards and gradually return to the original positions. Under the elastic action of the two springs 15, the isolation cylinder 10 and the annular pressing plate 12 are returned to the original positions, and then the drilled object can be taken down. Meanwhile, the contents which are not described in detail in the specification belong to the prior art which is well known to those skilled in the art.

In the drilling process, the object to be drilled can be automatically pressed and fixed to the top of the platform 1, displacement of the object in the drilling process can be avoided, the object can be sprayed to the surface of the drill bit 11 and the drilling position of the object more fully and evenly, and then the drill bit 11 can be effectively cooled and lubricated, so that the drilling quality is improved, the service life of the drill bit 11 is prolonged, the situation that the metal scraps and the cooling liquid splash everywhere to cause mess of the environment is avoided; and moreover, the cooling liquid can be used after being recycled and purified, waste of the cooling liquid is reduced, and resources are saved.

In the description of the present disclosure, it needs to be illustrated that the indicative direction or position relations of the terms such as "center", "top", "bottom", "left", "right", "vertical", "horizontal", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first" and "second" are just used for distinguishing the description, but cannot be understood to indicate or hint relative importance.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

We claim:

1. A drilling machine tool with a cooling liquid purifying and recycling mechanism, comprising a platform in which a blanking hole is formed, wherein a plurality of support pillars are fixedly mounted at a bottom of the platform, a vertically-arranged support plate is fixedly mounted on one side of the top of the platform, a transverse plate is fixedly mounted at a top of the support plate, air cylinders are fixedly mounted at a top of the transverse plate, output shaft ends of the air cylinders penetrate through the transverse plate and a lifting plate is mounted on the output shaft ends of the air cylinders, a motor is fixedly mounted at a top of the lifting plate, a output shaft of the motor is in transmission connection with a vertical shaft, the vertical shaft movably penetrates through the lifting plate, an isolation cylinder is arranged below the lifting plate, an opening is formed in a bottom of the isolation cylinder, a bottom end of the vertical shaft slidably penetrates through the isolation cylinder and is fixedly provided with a drill bit, the isolation cylinder is connected with the lifting plate through a pressing mechanism, and the drilling machine tool further comprises a cooling liquid conveying mechanism communicating with an interior of the isolation cylinder; and the cooling liquid purifying and recycling mechanism is arranged at the bottom of the platform and comprises a liquid storage tank, an opening is formed in the top of the liquid storage tank, a purifying assembly is arranged in the liquid storage tank, the liquid storage tank is located below the blanking hole, and the cooling liquid conveying mechanism communicates with the liquid storage tank;

wherein the cooling liquid conveying mechanism comprises a conveying pump, a liquid suction pipe, a hose, a hollow shaft, a liquid outlet disc, a plurality of spray heads, an L-shaped pipe and a transmission assembly;

the conveying pump is fixedly mounted on an outer wall of a side, adjacent to the support plate, of the liquid storage tank, the liquid suction pipe is fixedly mounted at a suction end of the conveying pump, an end, away from the conveying pump, of the liquid suction pipe extends into the liquid storage tank, one end of the hose is fixedly connected with a discharge end of the conveying pump, a positioning hole is formed in an inner wall of a side, adjacent to the support plate, of the isolation cylinder, the hollow shaft is rotatably mounted in the positioning hole through a bearing, two opposing ends of the hollow shaft both extend out of the positioning hole, the liquid outlet disc is fixedly mounted at one of the two opposing ends, away from the support plate, of the hollow shaft, the hollow shaft communicates with an interior of the liquid outlet disc, the plurality of spray heads are fixedly mounted on a side, away from the hollow shaft, of the liquid outlet disc at equal intervals, the L-shaped pipe is slidably mounted on a side wall, away from the liquid outlet disc, of the support plate through a pipe clamp, one end of the L-shaped pipe is fixedly connected with an end, away from the conveying pump, of the hose, an end, away from the hose, of the L-shaped pipe extends into the hollow shaft, a first sealing ring is fixedly mounted on an inner wall of the hollow shaft, and the L-shaped pipe is connected to the hollow shaft such that the hollow shaft is capable of rotating relative to the L-shaped pipe through the first sealing ring.

2. The drilling machine tool with a cooling liquid purifying and recycling mechanism according to claim 1, wherein the pressing mechanism comprises an annular pressing plate, two connecting bases, two sliding rods and two springs;

the annular pressing plate is fixedly mounted at the bottom of the isolation cylinder, the two connecting bases are fixedly mounted, opposed to one another, on an outer wall of the isolation cylinder, a bottom end of each of the two sliding rods is fixedly connected with a top of respective ones of the two connecting bases, a top end of each of the two sliding rods slidably penetrates through the lifting plate, and the two springs sleeve the two sliding rods respectively, a bottom end of each of the two springs is fixedly connected with the tops of the respective ones of the two connecting bases, a top end of each of the two springs are fixedly connected with the bottom of the lifting plate.

3. The drilling machine tool with a cooling liquid purifying and recycling mechanism according to claim 1, wherein a first sliding hole is formed in a top wall at a top of the isolation cylinder, and the bottom end of the vertical shaft penetrates through the first sliding hole and is fixedly provided with the drill bit; and a second sealing ring is fixedly mounted on an inner wall of the first sliding hole, and the vertical shaft is in sliding sealing fit with the first sliding hole through the second sealing ring.

4. The drilling machine tool with a cooling liquid purifying and recycling mechanism according to claim 1, wherein a vertically-arranged strip-shaped hole is formed through the support plate, and the other of the two opposing ends, adjacent to the support plate, of the hollow shaft penetrates through the strip-shaped hole.

5. The drilling machine tool with a cooling liquid purifying and recycling mechanism according to claim 4, wherein the transmission assembly comprises a lower shaft seat, a lower rotating shaft, a lower transmission bevel gear, a driven bevel gear, a positioning seat, an upper rotating shaft, a rectangular rod, an upper shaft seat, a transmission shaft, a driving bevel gear, an upper transmission bevel gear, a worm wheel and a worm, a rotary axis of the drill bit defines opposing upward and downward directions, upper features are above lower features in the upward direction, the lower shaft seat is fixedly mounted on the inner wall of the side, adjacent to the support plate, of the isolation cylinder, the lower rotating shaft is rotatably mounted on the lower shaft seat, the lower transmission bevel gear is fixedly mounted at a bottom end of the lower rotating shaft, the driven bevel gear fixedly sleeves the hollow shaft, the lower transmission bevel gear is meshed with the driven bevel gear, the positioning seat and the upper shaft seat are both fixedly mounted at the bottom of the lifting plate, the upper rotating shaft is rotatably mounted at a bottom of the positioning seat, a second sliding hole is formed in the top wall at the top of the isolation cylinder, the bottom end of the upper rotating shaft penetrates through the second sliding hole and is provided with a rectangular groove, the rectangular rod is slidably mounted in the rectangular groove, a bottom end of the rectangular rod extends out of the rectangular groove and is fixedly connected with a top end of the lower rotating shaft, the transmission shaft is rotatably mounted on the upper shaft seat, the driving bevel gear is fixedly mounted at an end, adjacent to the support plate, of the transmission shaft, the upper transmission bevel gear fixedly sleeves the upper rotating shaft, the driving bevel gear is meshed with the upper transmission bevel gear, the worm wheel is fixedly mounted at another end of the transmission shaft, the worm fixedly sleeves the vertical shaft, and the worm is meshed with the worm wheel.

6. The drilling machine tool with a cooling liquid purifying and recycling mechanism according to claim 5, wherein a second sealing ring is fixedly mounted on an inner wall of the second sliding hole, and the upper rotating shaft is in sliding sealing fit with the second sliding hole through the second sealing ring.

7. The drilling machine tool with a cooling liquid purifying and recycling mechanism according to claim 1, wherein the purifying assembly comprises a filter screen and an activated carbon filter plate, the filter screen and the activated carbon filter plate are both fixedly mounted in the liquid storage tank, and the filter screen is obliquely arranged above the activated carbon filter plate.

\* \* \* \* \*